(12) United States Patent
Jang et al.

(10) Patent No.: US 7,616,279 B2
(45) Date of Patent: Nov. 10, 2009

(54) THIN FILM TRANSISTOR ARRAY AND TRANSFLECTIVE LIQUID CRYSTAL DISPLAY PANEL

(75) Inventors: Ching-Yu Jang, Su-ao Township (TW); Chia-Ching Chu, Yonghe (TW); Ying-Yi Chen, Lujhou (TW)

(73) Assignee: TPO Displays Corp., Chu-Nan (TW)

( * ) Notice: Subject to any disclaimer, the term of this patent is extended or adjusted under 35 U.S.C. 154(b) by 390 days.

(21) Appl. No.: 11/335,075

(22) Filed: Jan. 18, 2006

(65) Prior Publication Data
US 2007/0165169 A1    Jul. 19, 2007

(51) Int. Cl.
G02F 1/1335 (2006.01)
G02F 1/1337 (2006.01)
G02F 1/141 (2006.01)
G02F 1/1333 (2006.01)

(52) U.S. Cl. .................. 349/123; 349/114; 349/126; 349/134; 349/136; 349/158

(58) Field of Classification Search ............... 349/123, 349/114, 126, 134, 136, 158
See application file for complete search history.

(56) References Cited

U.S. PATENT DOCUMENTS

| | | | |
|---|---|---|---|
| 6,177,973 B1 * | 1/2001 | Lee et al. ................... 349/123 |
| 2004/0100603 A1 * | 5/2004 | Ozawa ....................... 349/123 |
| 2005/0083459 A1 * | 4/2005 | Ukawa et al. ............... 349/114 |
| 2006/0050212 A1 * | 3/2006 | Tsuchiya .................... 349/114 |

* cited by examiner

*Primary Examiner*—Frank G Font
*Assistant Examiner*—Jerry Blevins
(74) *Attorney, Agent, or Firm*—Liu & Liu

(57) ABSTRACT

An array substrate including a substrate, multiple pixels arranged in an array on the substrate, and an alignment film disposed on the pixels is provided. The pixel includes a reflective region, a transmissive region, and a transition region formed between the reflective region and the transmissive region, wherein an included angle between at least one side of the transition region and a rubbing direction of the alignment film is smaller than or equal to 30 degree. In addition, a transflective LCD including the array substrate as described above and a fabricating method of an array substrate is further provided.

17 Claims, 18 Drawing Sheets

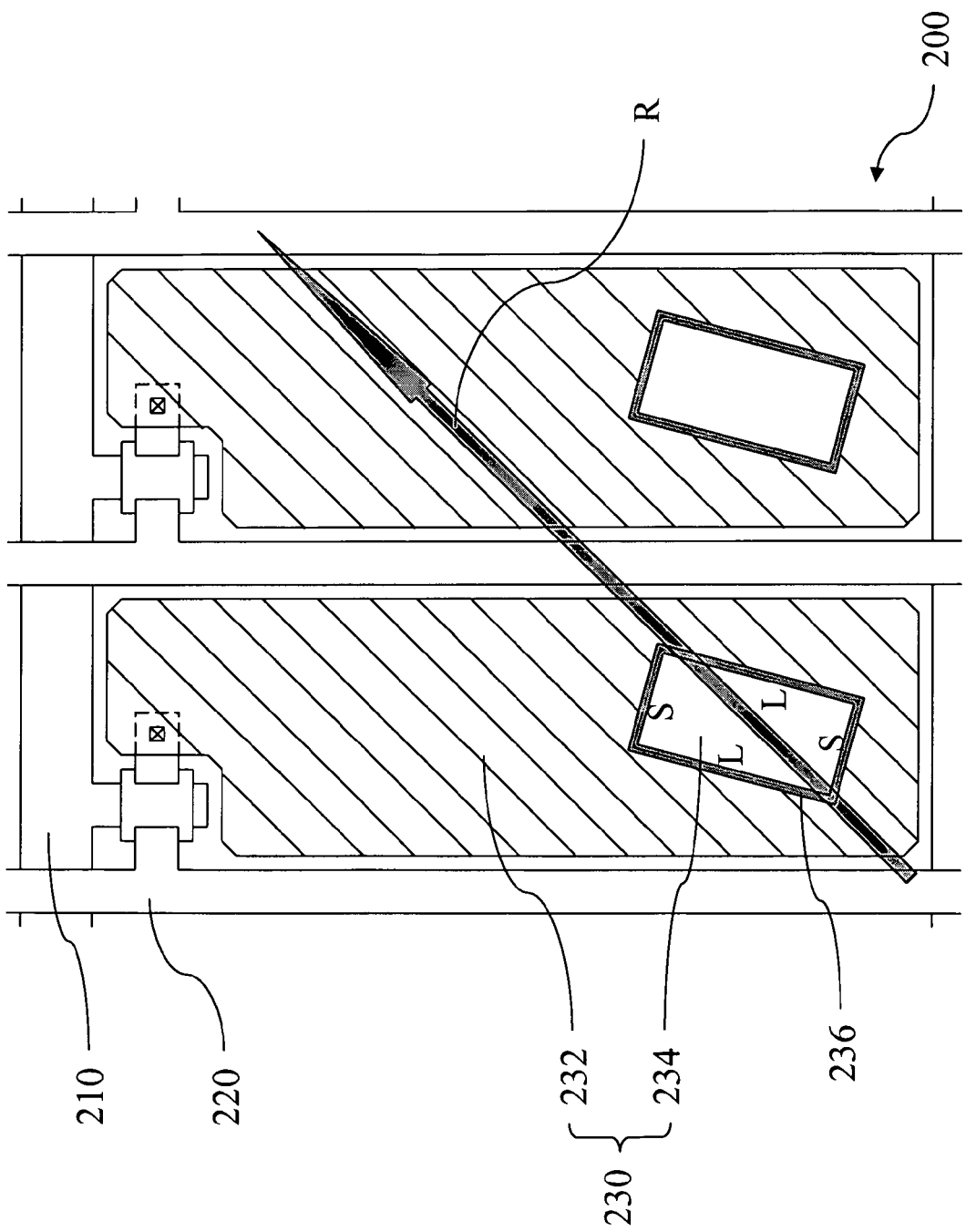

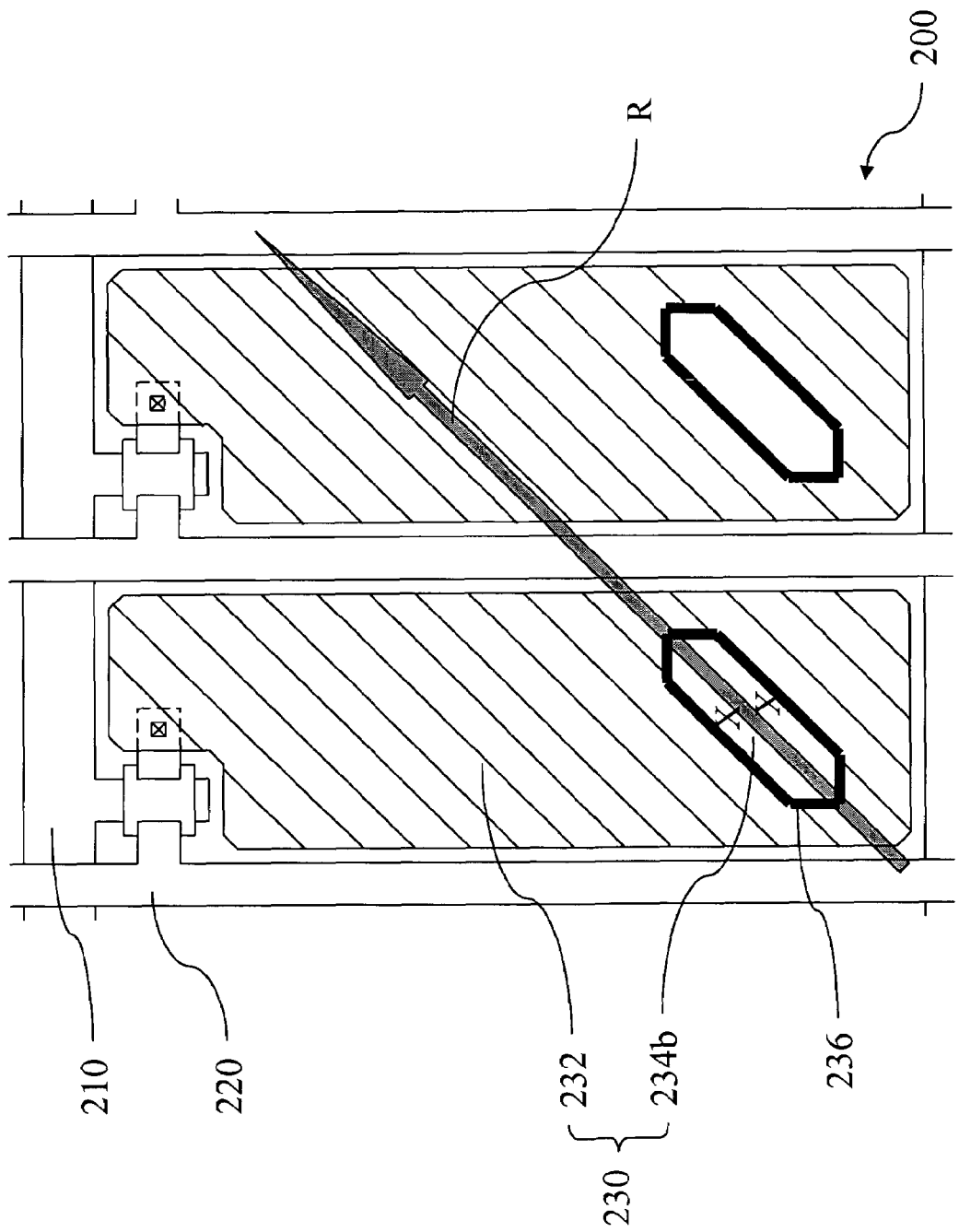

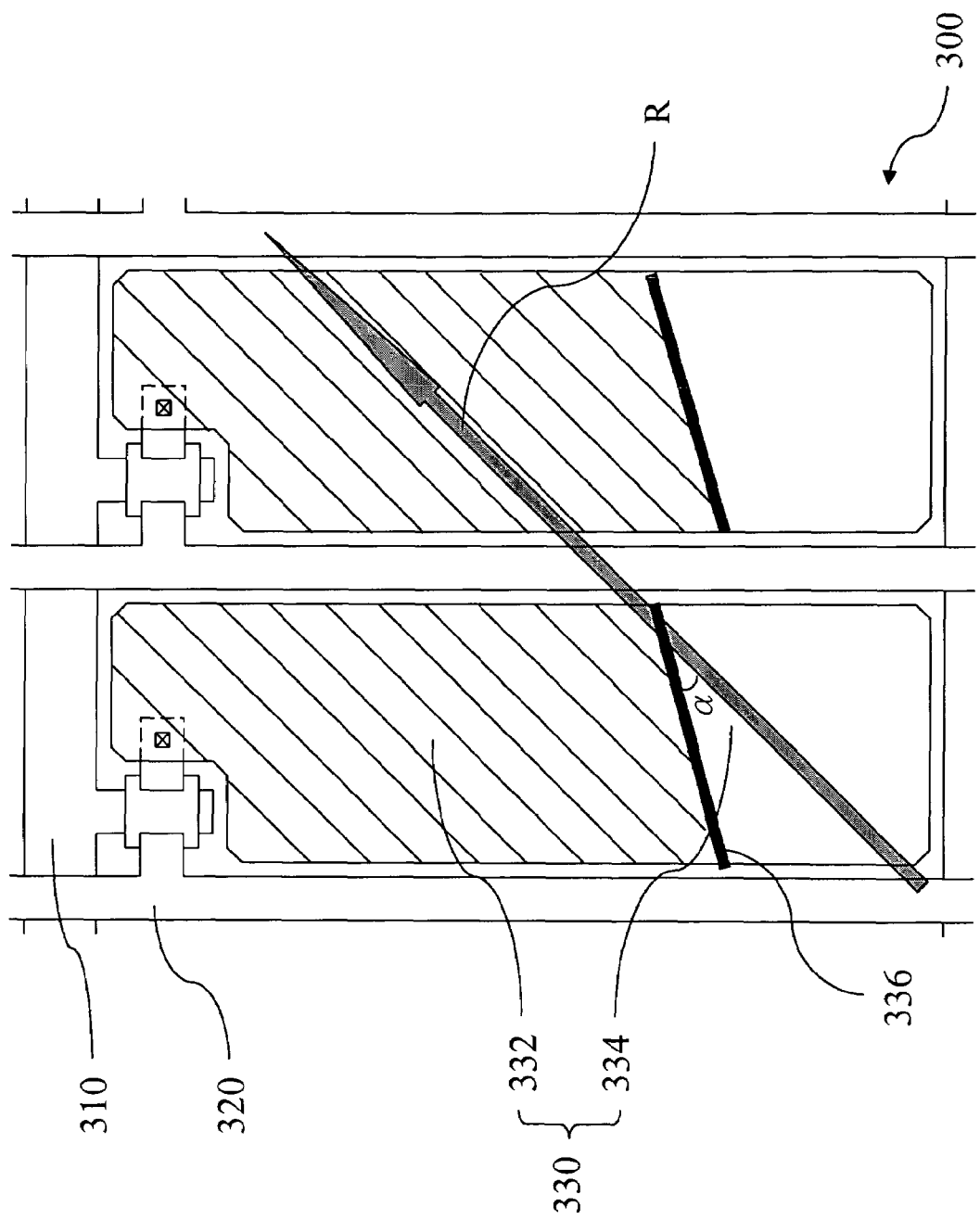

THIN FILM TRANSISTOR ARRAY AND TRANSFLECTIVE LIQUID CRYSTAL DISPLAY PANEL

BACKGROUND OF THE INVENTION

1. Field of the Invention

The present invention relates to a thin film transistor array (TFT array). More particularly, the present invention relates to a transflective liquid crystal display (Transflective LCD) with high contrast ratio.

2. Description of Related Art

To match the life style of modern people, video or imaging equipment is becoming lighter and slimmer. Although the conventional cathode ray tube (CRT) has many advantages, the design of the electron gun renders it heavy and bulky. Moreover, there is always some risk of hurting viewer's eyes due to the production of some harmful radiation. With big leaps in the techniques in manufacturing semiconductor devices and opto-electronic devices, flat panel displays such as liquid crystal displays (LCD), organic light-emitting displays (OLED) and plasma display panels (PDP) has gradually become the mainstream display products.

According to the light source used, a liquid crystal display can be classified into three types: reflective LCD, transmissive LCD and transflective LCD. Taking a transflective LCD as an example, the transflective LCD mainly includes a transflective liquid crystal panel and a back light module. The transflective LCD panel includes a thin film transistor array, a color filter and a liquid crystal layer sandwiched therebetween. The back light module provides a surface light source to illuminate the transflective LCD panel for displaying images. More specifically, the thin film transistor array includes a plurality of pixels, each pixel has a transmissive region and a reflective region respectively, and wherein the thickness of liquid crystal layer located above the transmissive region is different from the thickness of liquid crystal layer located above the reflective region.

FIG. 1 is a schematic top view of a conventional transflective thin film transistor array. Referring FIG. 1, the conventional transflective thin film transistor array 100 includes a substrate (not shown), a plurality of scan lines 110 disposed on the substrate, a plurality of data lines 120 disposed on the substrate and a plurality of pixels 130 disposed on the substrate. Moreover, the conventional transflective thin film transistor array 100 further includes an alignment film (not shown) disposed over the substrate to cover the scan lines 110, the data lines 120 and the pixels 130.

As shown in FIG. 1, each pixel 130 includes a reflective region 132 and a transmissive region 134, wherein the transmissive region 134 is connected to and enclosed by the reflective region 132. A transition region (taper) 136 is formed between the reflective region 132 and the transmissive region 134 because different cell gaps are required in the reflective region 132 and the transmissive region 134. The profile of the transmissive region 134 is rectangle having a pair of long opposite sides L and a pair of short opposite sides S. It should be noted that, in the prior art, an included angle α between the long opposite side L or the short opposite side S of the transmissive region 134 and a rubbing direction R of the alignment film is about 45 degree. In other words, an included angle α between the extending direction of the transition region 136, which is parallel with the long opposite side L or the short opposite side S of the transmissive region 134, and a rubbing direction R of the alignment film is also about 45 degree. Due to the included angle α being about 45 degree, light leakage phenomenon occurs at the transition region 136. Therefore, contrast ratio of image displayed by a transflective LCD panel using the transflective thin film transistor array 100 is deteriorated. As described above, high definition transflective LCD panels having enhanced contrast ratio are required.

SUMMARY OF THE INVENTION

The invention is directed to an array substrate, a transflective liquid crystal display with high contrast ratio, and a fabricating method of an array substrate.

As embodied and broadly described herein, the present invention provides an array substrate. The array substrate comprises a substrate, a plurality of pixels arranged in an array on the substrate, and an alignment film disposed on the pixels. The pixel comprises a reflective region, a transmissive region, and a transition region formed between the reflective region and the transmissive region, wherein an included angle between at least one side of the transition region and a rubbing direction of the alignment film is smaller than or equal to 30 degree.

As embodied and broadly described herein, the present invention provides a transflective liquid crystal display panel comprising an array substrate, an opposite substrate above the array substrate, and a liquid crystal layer located between the opposite substrate and the array substrate. The array substrate comprises a substrate, a plurality of pixels arranged in an array on the substrate, and an alignment film disposed on the pixels. The pixel comprises a reflective region, a transmissive region, and a transition region formed between the reflective region and the transmissive region, wherein an included angle between at least one side of the transition region and a rubbing direction of the alignment film is smaller than or equal to 30 degree.

As embodied and broadly described herein, the present invention provides a fabricating method of an array substrate. The method comprises the steps of: providing a substrate with a plurality of pixels thereon, wherein the pixel comprising a reflective region, a transmissive region, and a transition region formed between the reflective region and the transmissive region; forming a dielectric layer over the substrate to cover the pixels; and rubbing the dielectric layer to form an alignment film with a rubbing direction, wherein an included angle between at least one side of the transition region and the rubbing direction of the alignment film is smaller than or equal to 30 degree.

One or part or all of these and other features and advantages of the present invention will become readily apparent to those skilled in this art from the following description wherein there is shown and described a preferred embodiment of this invention, simply by way of illustration of one of the modes best suited to carry out the invention. As it will be realized, the invention is capable of different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A~FIG. 3C are schematic top views of a transflective thin film transistor array according to the first embodiment of the present invention.

FIG. 5A~FIG. 5C and FIG. 6A~FIG. 6B are schematic top views of a transflective thin film transistor array according to the third embodiment of the present invention.

FIG. 7A~FIG. 7C are schematic top views of a transflective thin film transistor array according to the fourth embodiment of the present invention.

DESCRIPTION OF THE PREFERRED EMBODIMENTS

First Embodiment

Figure 1:
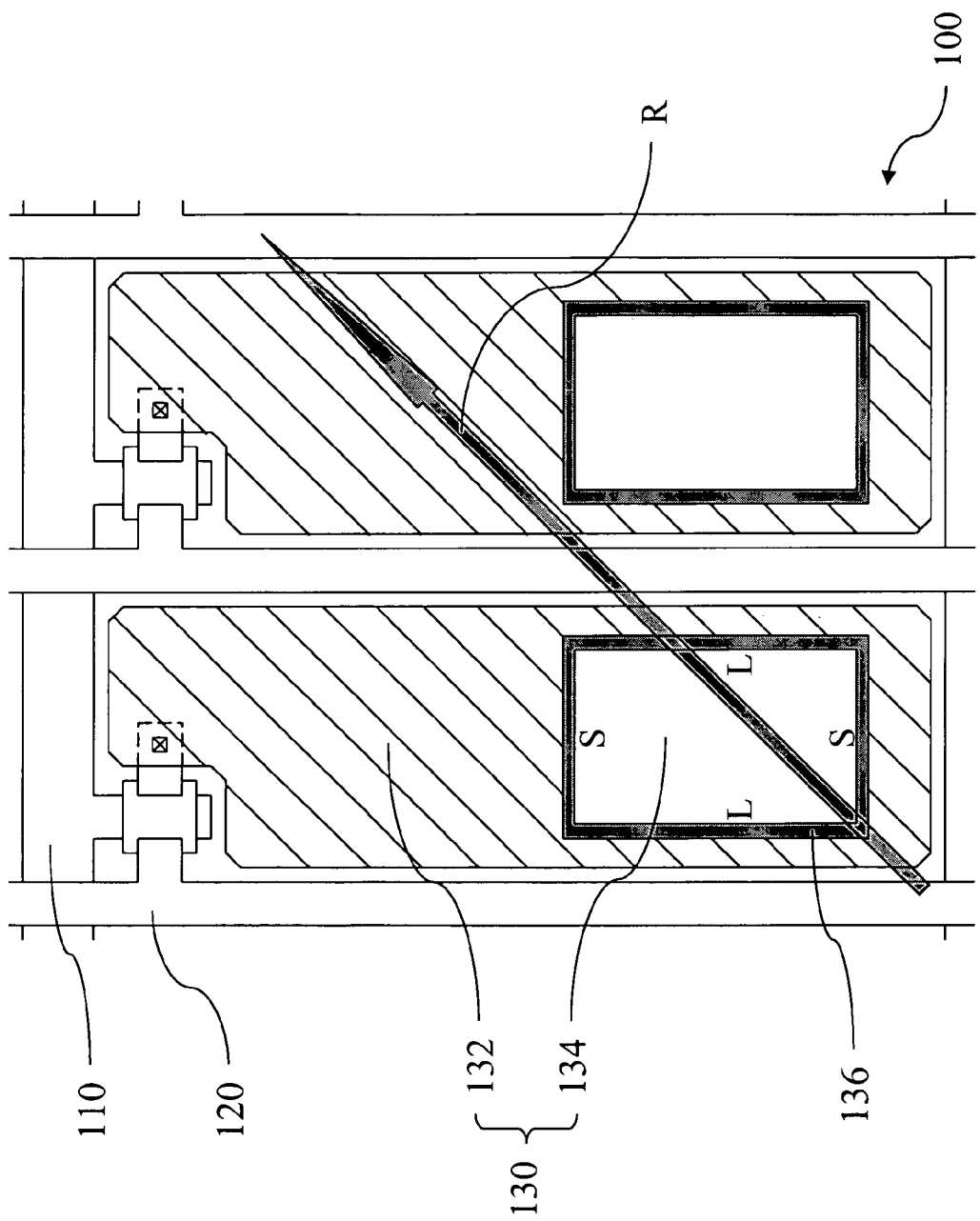
FIG. 1 is a schematic top view of a conventional transflective thin film transistor array.
Figure 2A:
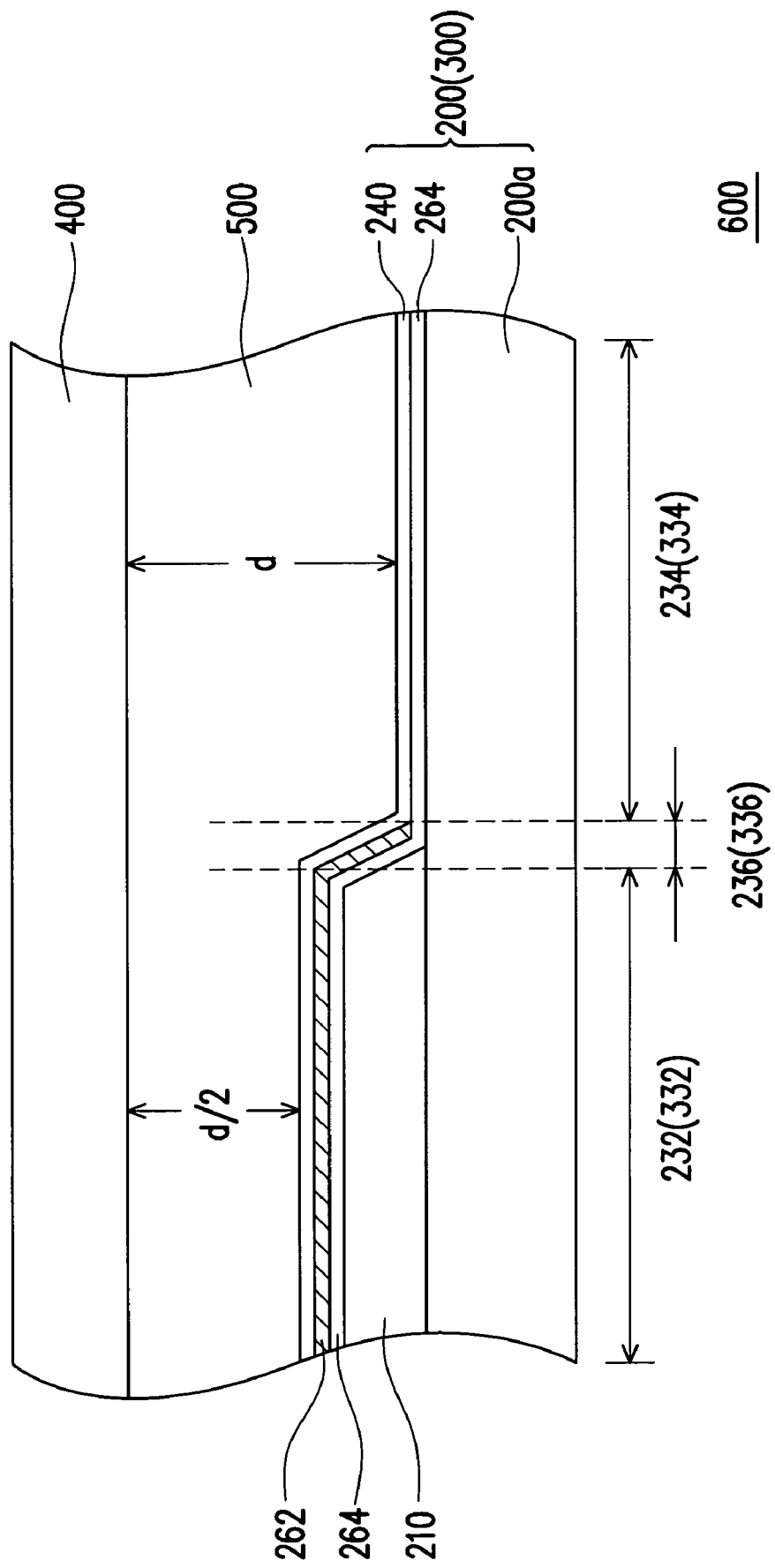
FIG. 2A is a cross-sectional view of a transflective LCD panel according to some embodiments of the present invention.

FIG. 2A is a cross-sectional view of a transflective LCD panel according to some embodiments of the present invention. Referring to FIG. 2A, the transflective liquid crystal display 600 includes a thin film transistor array 200, an opposite substrate 400 and a liquid crystal layer 500. The opposite substrate 400 is located above the thin film transistor array 200. The liquid crystal layer 500 is filled between the opposite substrate 400 and the thin film transistor array 200. In the transflective liquid crystal display 600 of the present invention, dual cell-gaps are formed between the opposite substrate 400 and the thin film transistor array 200.

More specifically, the thin film transistor array 200 includes a plurality of pixels. Each pixel of the thin film transistor array 200 includes, from the bottom to the top, a substrate 200a with a thin film transistor (not shown in FIG. 2A), a planarization layer 210 on the substrate 200a, a transparent pixel electrode 264, a reflective electrode 262, and an alignment film 240. First, a planarization layer 210 is formed on a substrate 200a. Then, the planarization layer 210 is patterned to form an opening in a transmissive region 234. Then, a transparent pixel electrode 264 is formed on the substrate 200a. Then, a reflective electrode 262 is formed and then patterned to form an opening in the transmissive region 234. In this way, the reflective electrode 262 remains in a reflective region 232, and a transition region (taper) 236 is formed between the transmissive region 234 and the reflective region 232. The cell gap formed between the reflective region 232 and the opposite substrate 400 can be d/2, while the cell gap formed between the transmissive region 234 and the opposite substrate 400 can be d.

Figure 2B:
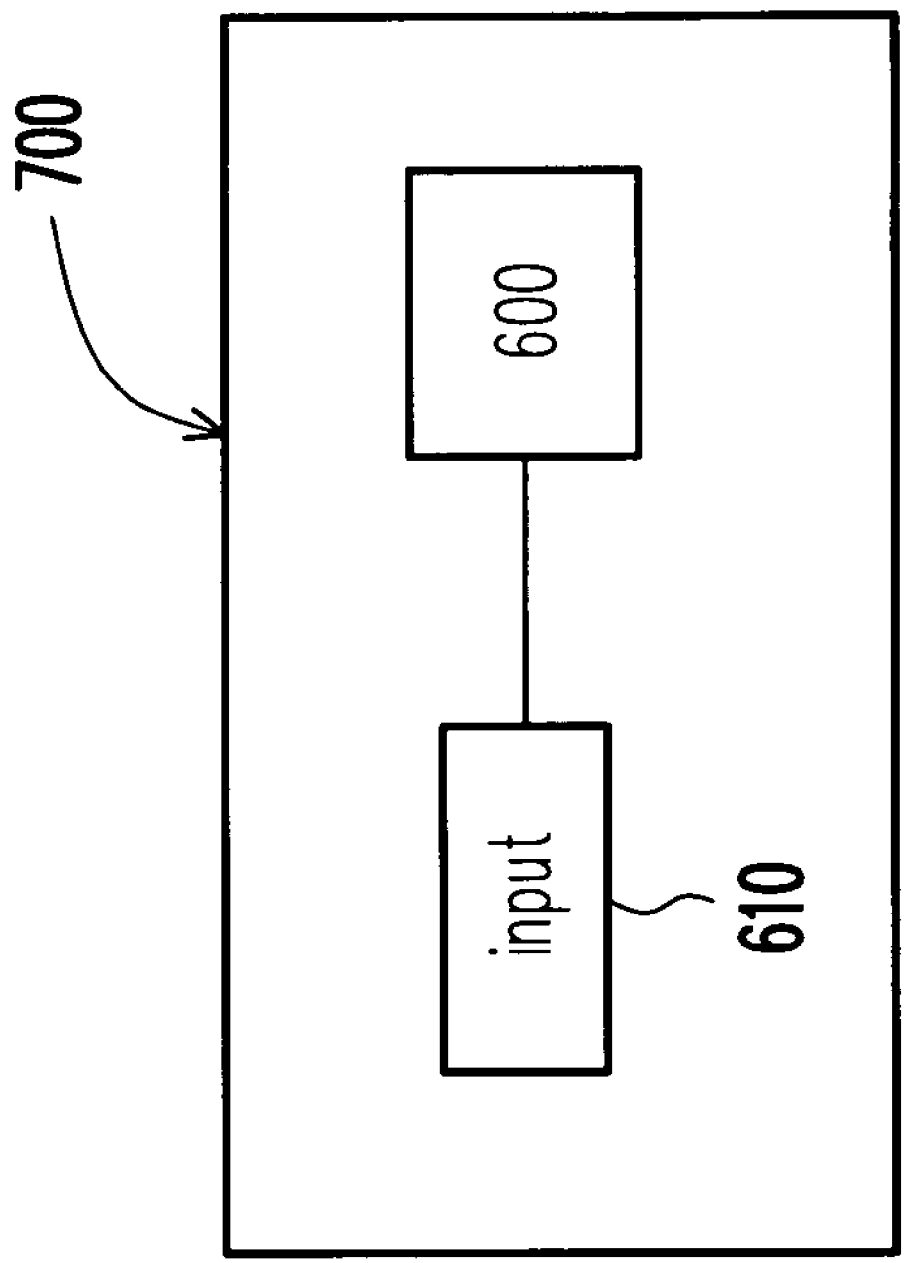
FIG. 2B schematically shows an electronic device including the transflective LCD panel according to some embodiments of the present invention.

FIG. 2B schematically shows an electronic device 700 including the transflective LCD panel according to some embodiments of the present invention. The electronic device 700 may be a PDA (personal data assistant), notebook computer, tablet computer, cellular phone, car TV, digital camera, or a display monitor device, etc. Generally, the electronic device 700 comprises the transflective LCD panel 600 shown in FIG. 2a and an input unit 610. Further, the input unit 610 is operatively coupled to the transflective LCD panel 600 and provides input signals (e.g., image signal) to the panel 600 to generate image.

In order to manufacture color LCD panels, color filter films (CF) and/or black matrix (BM) may be formed over the opposite substrate 400. However, color filter films (CF) and/or black matrix (BM) may also be formed over the thin film transistor array 200 by COA (Color filter On Array) technology.

To improve the light leakage phenomenon and the contrast ratio of the images displayed by the transflective LCD panels, various novel profiles of the transmissive region are illustrated in following embodiments. In the following embodiments of the present invention, an included angle between at least one side of the transmissive regions and a rubbing direction of the alignment film is controlled in a specific range (smaller than or equal to 30 degree) by modifying the profile of the transmissive region or the rubbing direction of the alignment film.

Figure 3A:
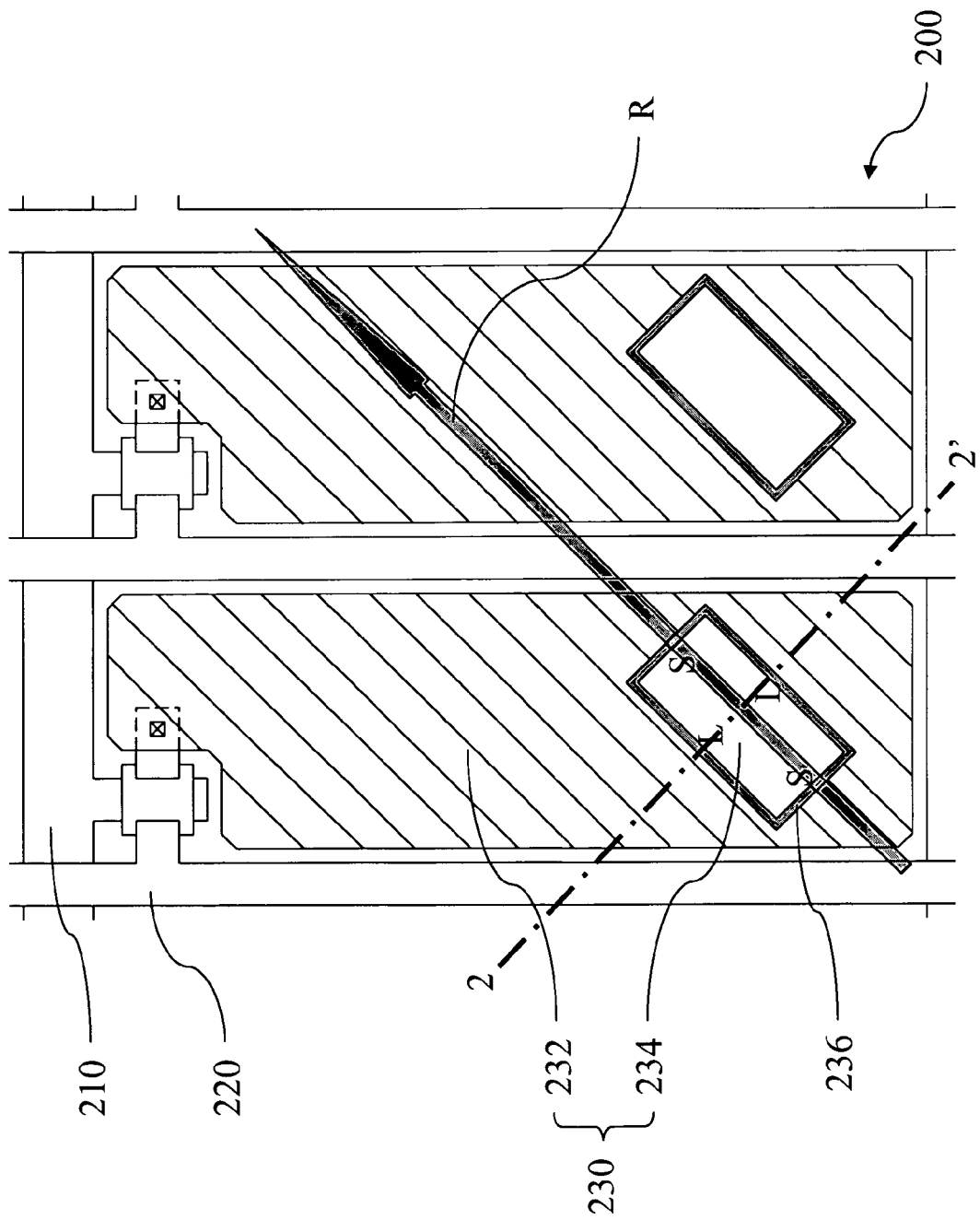
Figure 3C:
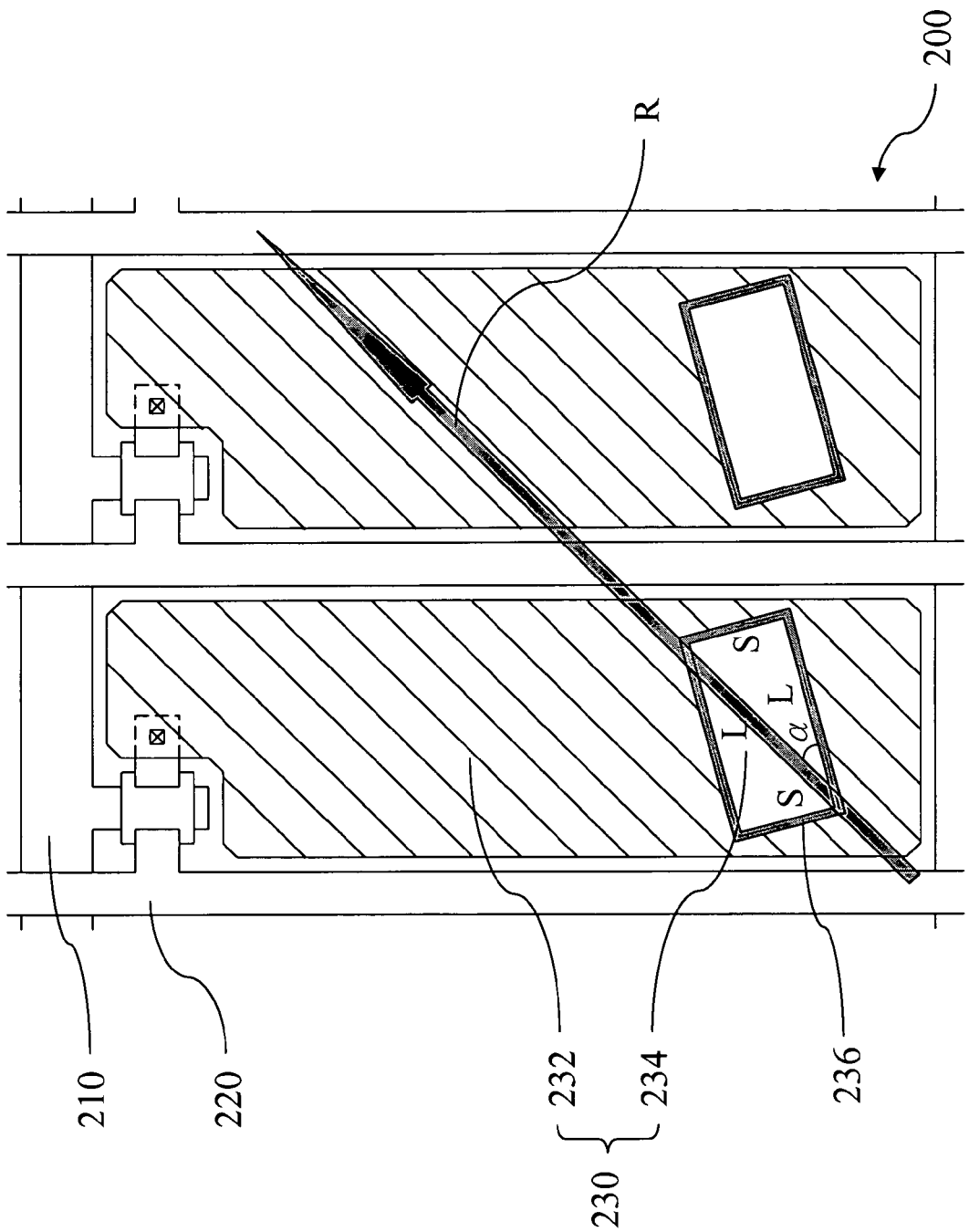

FIG. 3A~FIG. 3C are schematic top views of a transflective thin film transistor array according to the first embodiment of the present invention. FIG. 2 is a cross-sectional view taken along line 2-2' of FIG. 3A.

Referring to FIG. 2 and FIG. 3A, the thin film transistor array 200 of the present embodiment includes a substrate 200a, a plurality of scan lines 210, a plurality of data lines 220, a plurality of pixels 230 and an alignment film 240. The scan lines 210, the data lines 220 and the pixels 230 are disposed on the substrate 200a. More specifically, a plurality of pixel-areas are defined by the scan lines 210 and the data lines 220, and the pixels 230 are disposed in corresponding pixel-area. Moreover, the alignment film 240 is disposed over the substrate 200a to cover the scan lines 210, the data lines 220 and the pixels 230 such that arrangement (pre-tilt or orientation etc.) of the liquid crystal layer 500 is controlled thereby.

As shown in FIG. 3A~FIG. 3C, each pixel 230 includes a reflective region 232 and a transmissive region 234. In each pixel 230, the transmissive region 234 is connected to and enclosed by the reflective region 232, and a transition region 236 is formed between the reflective region 232 and the transmissive region 234. It should be noted that an included angle α between at least one side of the transmissive regions 232 and a rubbing direction R of the alignment film 240 is smaller than or equal to 30 degree. In the present embodiments illustrated in FIG. 3A~FIG. 3C, an included angle between one of the scan lines 210 and the rubbing direction R of the alignment film 240 is about 45 degree, for example.

As shown in FIG. 3A~FIG. 3C, the profile of the transmissive regions 234 is a rectangle having a pair of long opposite sides L and a pair of short opposite sides S, for example. In FIG. 3A, the pair of long opposite sides L is parallel to the rubbing direction R of the alignment film 240 (shown in FIG. 2). In FIG. 3B and FIG. 3C, an included angle α between the pair of long opposite sides L and the rubbing direction R of the alignment film 240 (shown in FIG. 2) is smaller than or equal to 30 degree. Light leakage can be reduced effectively through the transmissive region 234 with particular profile and the included angle between one side of the transmissive region and the rubbing direction R of the alignment film.

Figure 3D:
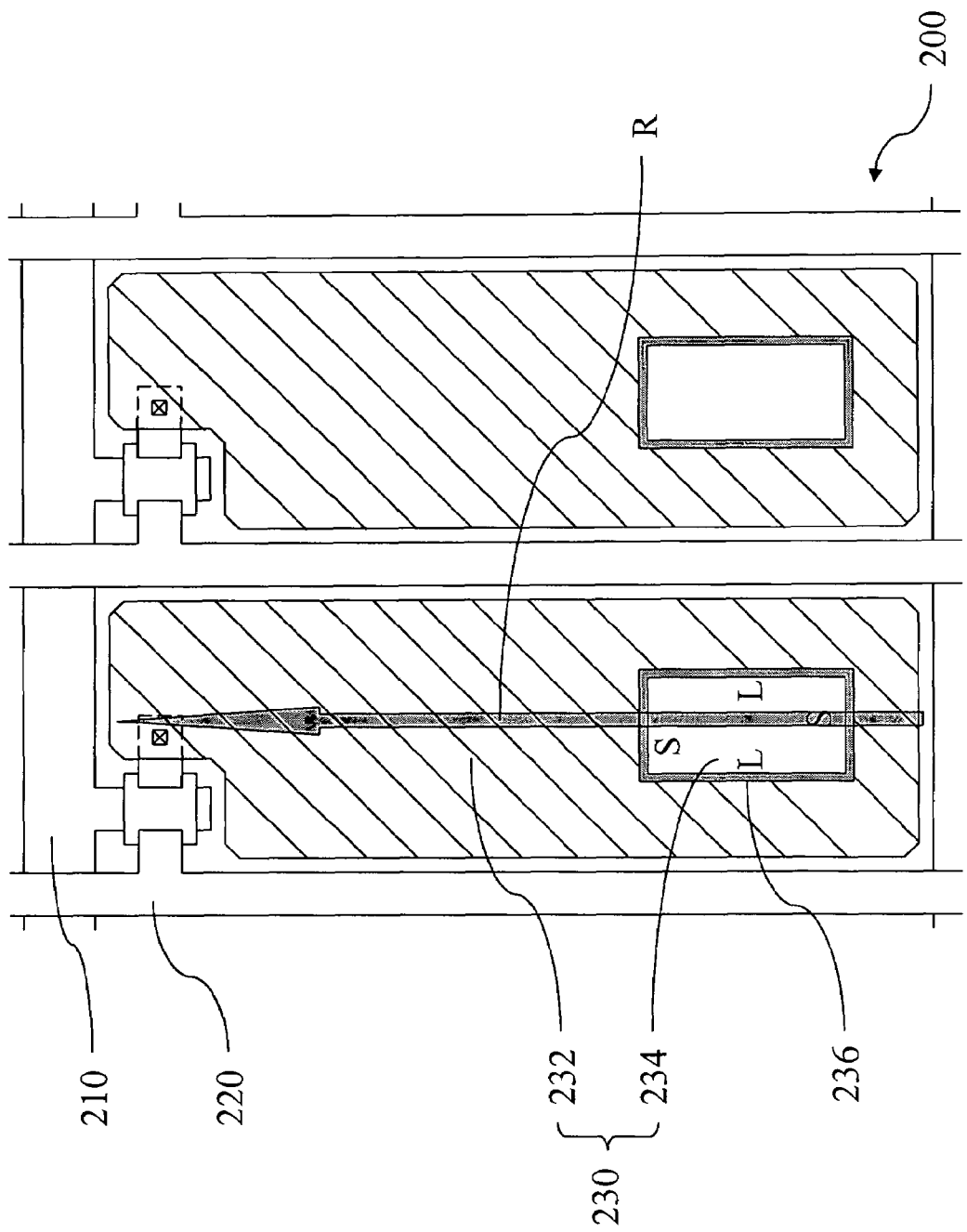
FIG. 3D is a schematic top view of a transflective thin film transistor array according to the first embodiment of the present invention.

FIG. 3D is a schematic top view of a transflective thin film transistor array according to the first embodiment of the present invention. Referring to FIG. 3D, one of the scan lines 210 and the rubbing direction R of the alignment film 240 are parallel with each other. Furthermore, an included angle α between at least one side of the transmissive regions 232 and a rubbing direction R of the alignment film 240 is equal to 0 degree. Light leakage can be reduced effectively through the included angle between one the long side L of the transmissive region 234 and the rubbing direction R of the alignment film.

Second Embodiment

Figure 4A:
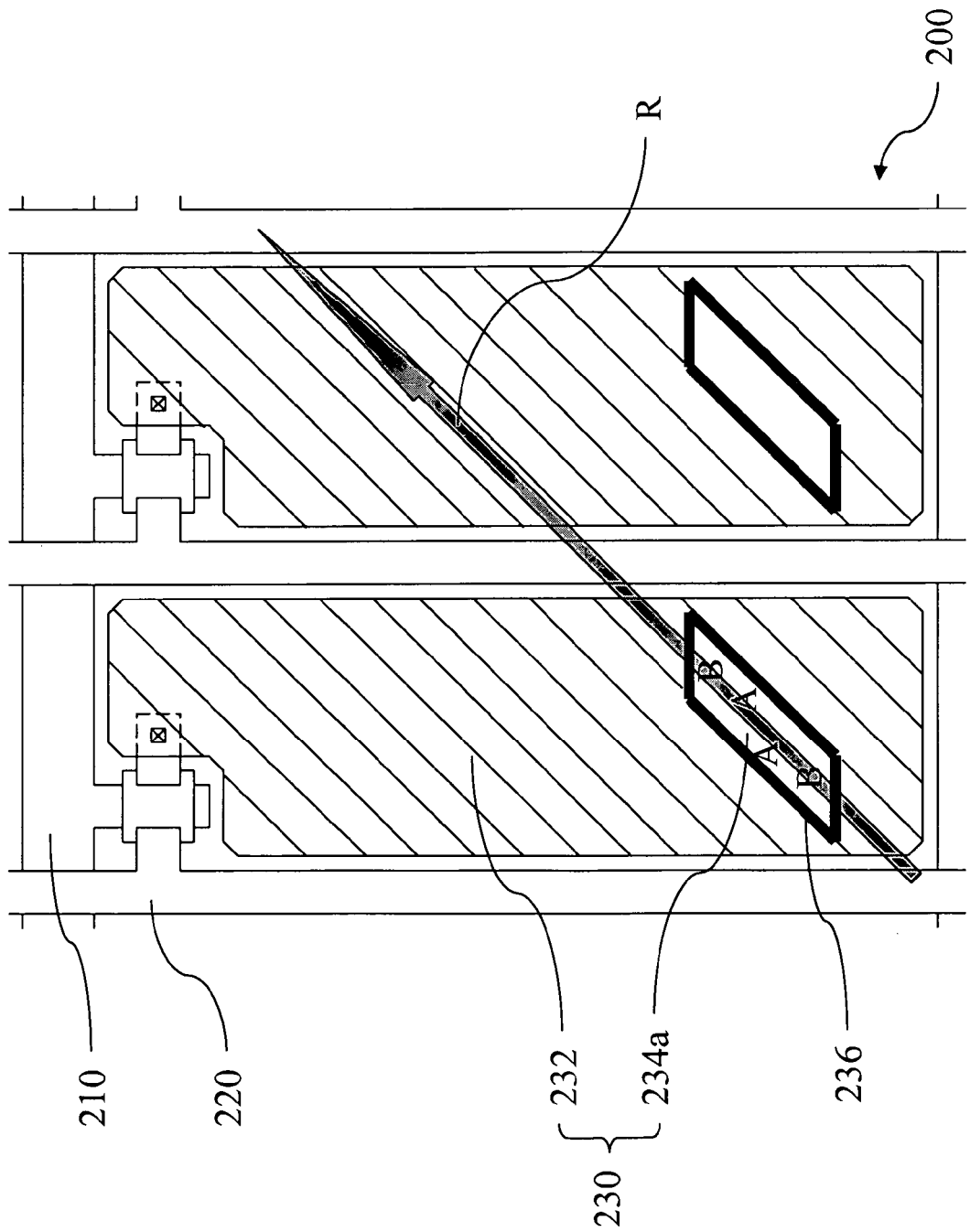
FIG. 4A~FIG. 4C are schematic top views of a transflective thin film transistor array according to the second embodiment of the present invention.
Figure 4B:
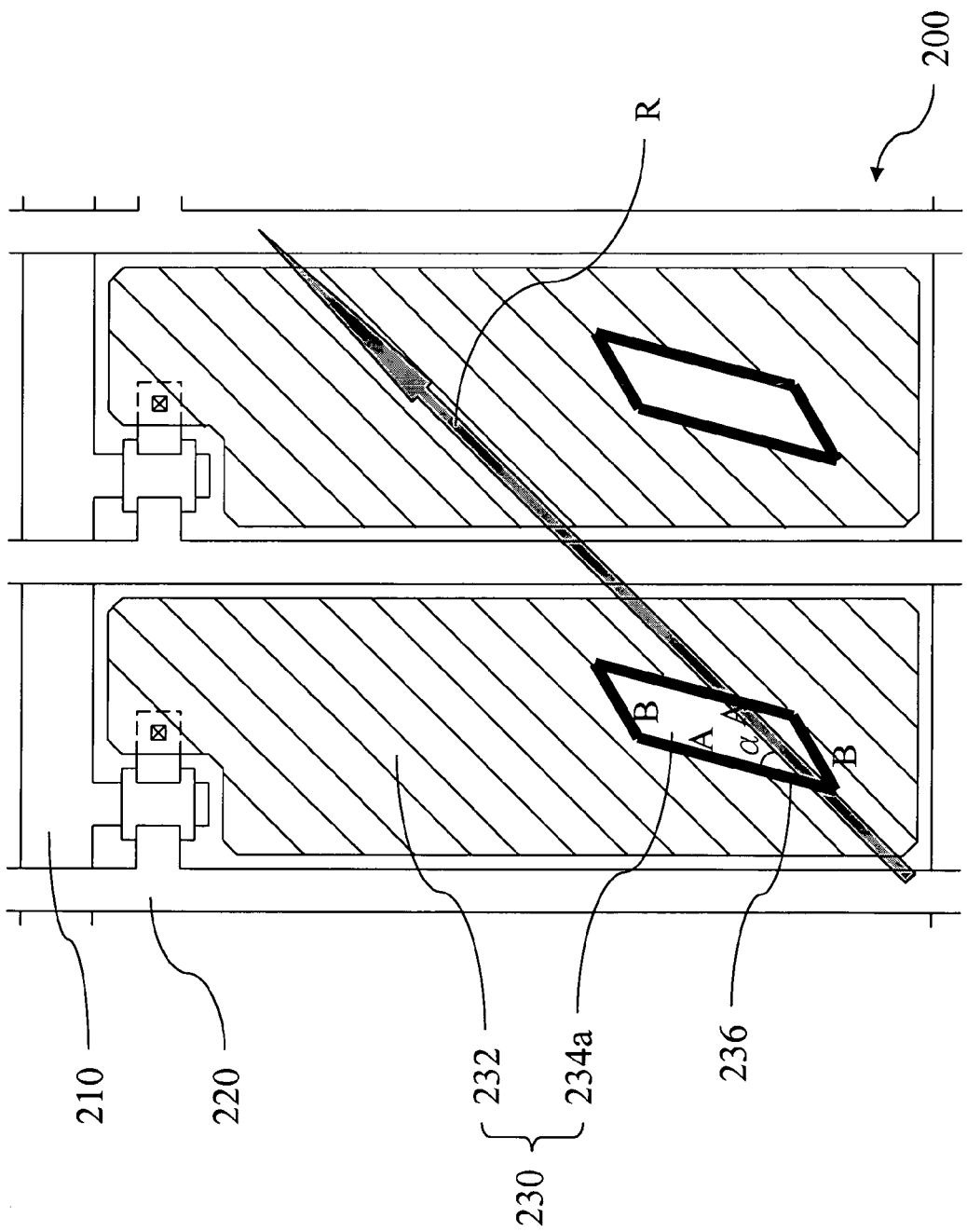
Figure 4C:
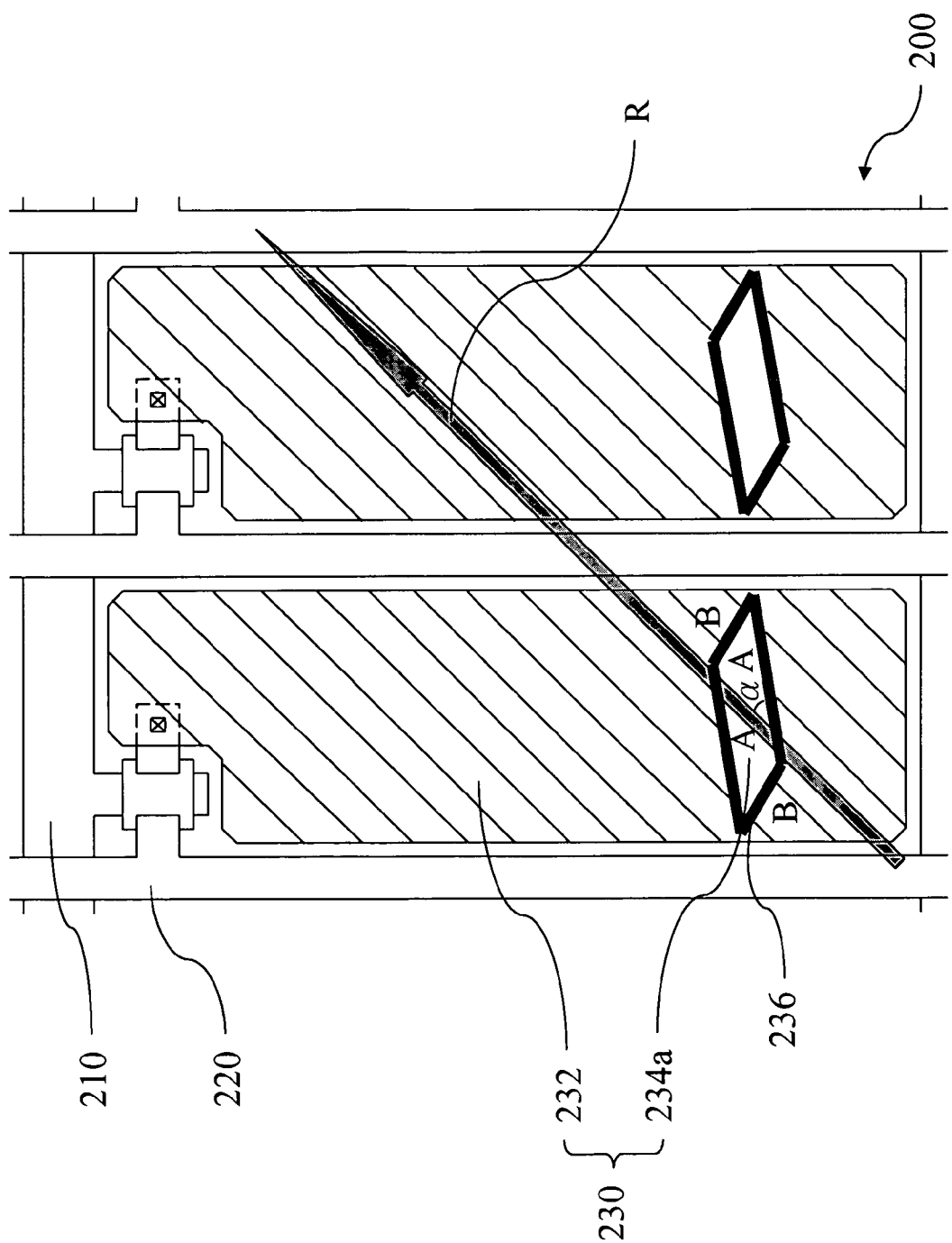

FIG. 4A~FIG. 4C are schematic top views of a transflective thin film transistor array according to the second embodiment of the present invention. As shown in FIG. 4A~FIG. 4C, the profile of the transmissive regions 234 is a parallelogram having a pair of first opposite sides A and a pair of second opposite sides B, for example. The length of the pair of first opposite sides A is longer than that of the pair of second opposite sides B, for example. In FIG. 4A, the pair of first opposite sides A is parallel to the rubbing direction R of the alignment film 240. In FIG. 4B and FIG. 4C, an included angle α between the pair of first opposite sides A and the rubbing direction R of the alignment film 240 (shown in FIG. 2) is smaller than 30 degree.

As shown in FIG. 4B, the included angle α between the first opposite sides A and the rubbing direction R of the alignment film 240 (shown in FIG. 2) is smaller than or equal to 30 degree. As described above, the light leakage is reduced and the contrast ratio is further improved.

Third Embodiment

FIG. 5A~FIG. 5C and FIG. 6A~FIG. 6B are schematic top views of a transflective thin film transistor array according to the third embodiment of the present invention. Referring to FIG. 5A~FIG. 5C and FIG. 6A~FIG. 6B, the profile of the transmissive regions 232 is polygon, such as pentagon (right side of FIG. 6B), hexagon (FIG. 5A~FIG. 5C), heptagon (left side of FIG. 6B) or octagon (left side of FIG. 6A), having a pair of opposite sides X, for example.

Figure 5B:
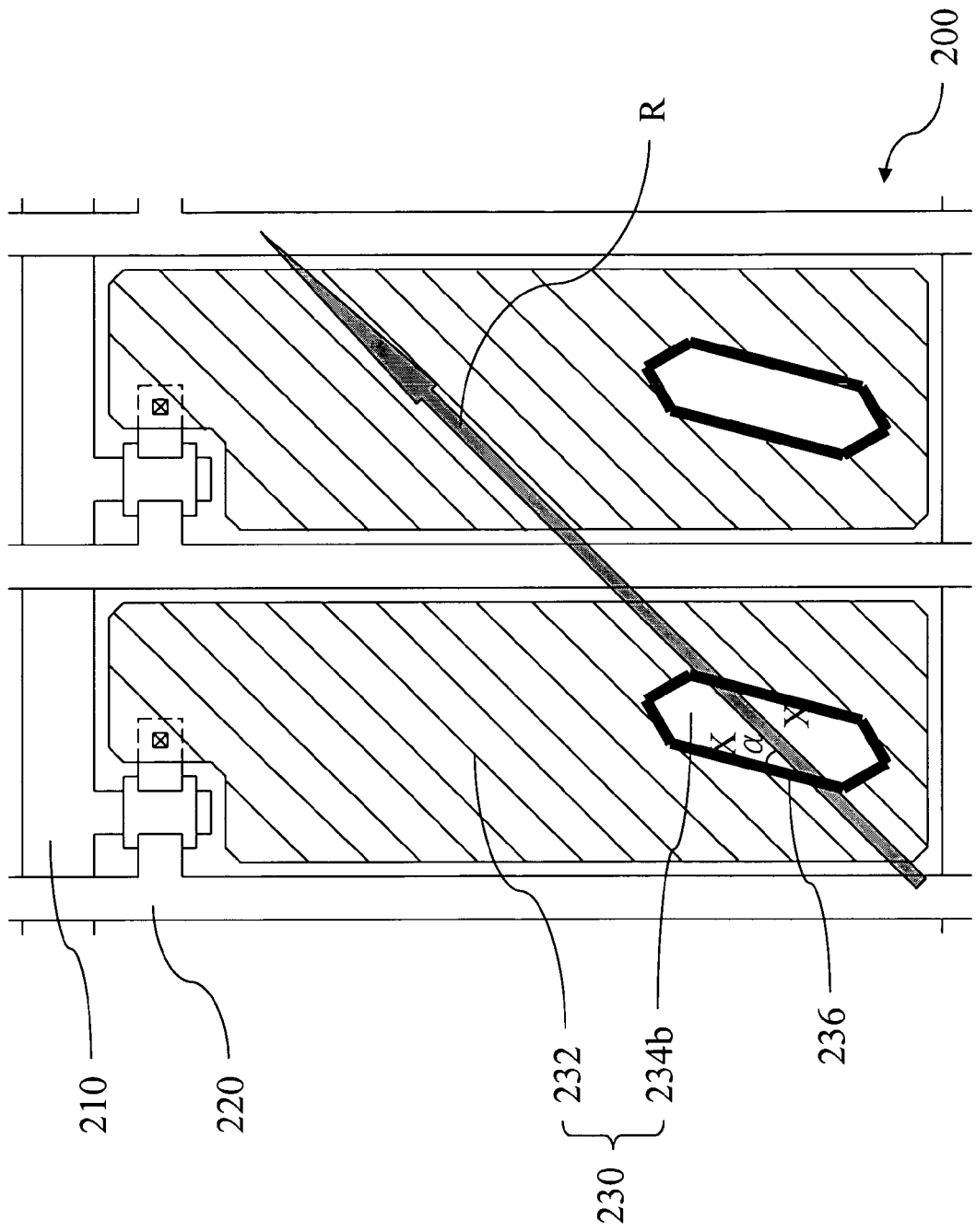
Figure 5C:
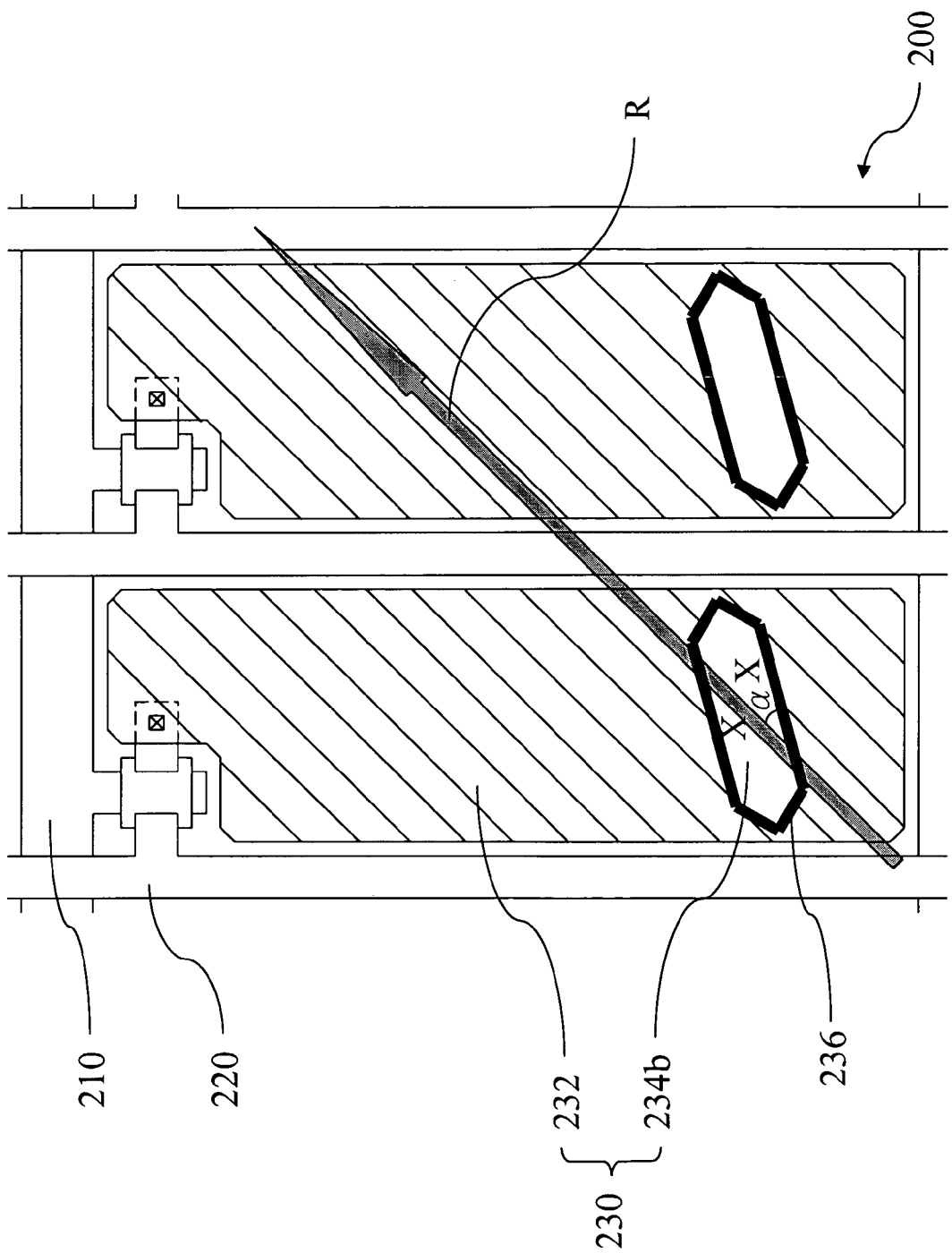
Figure 6A:
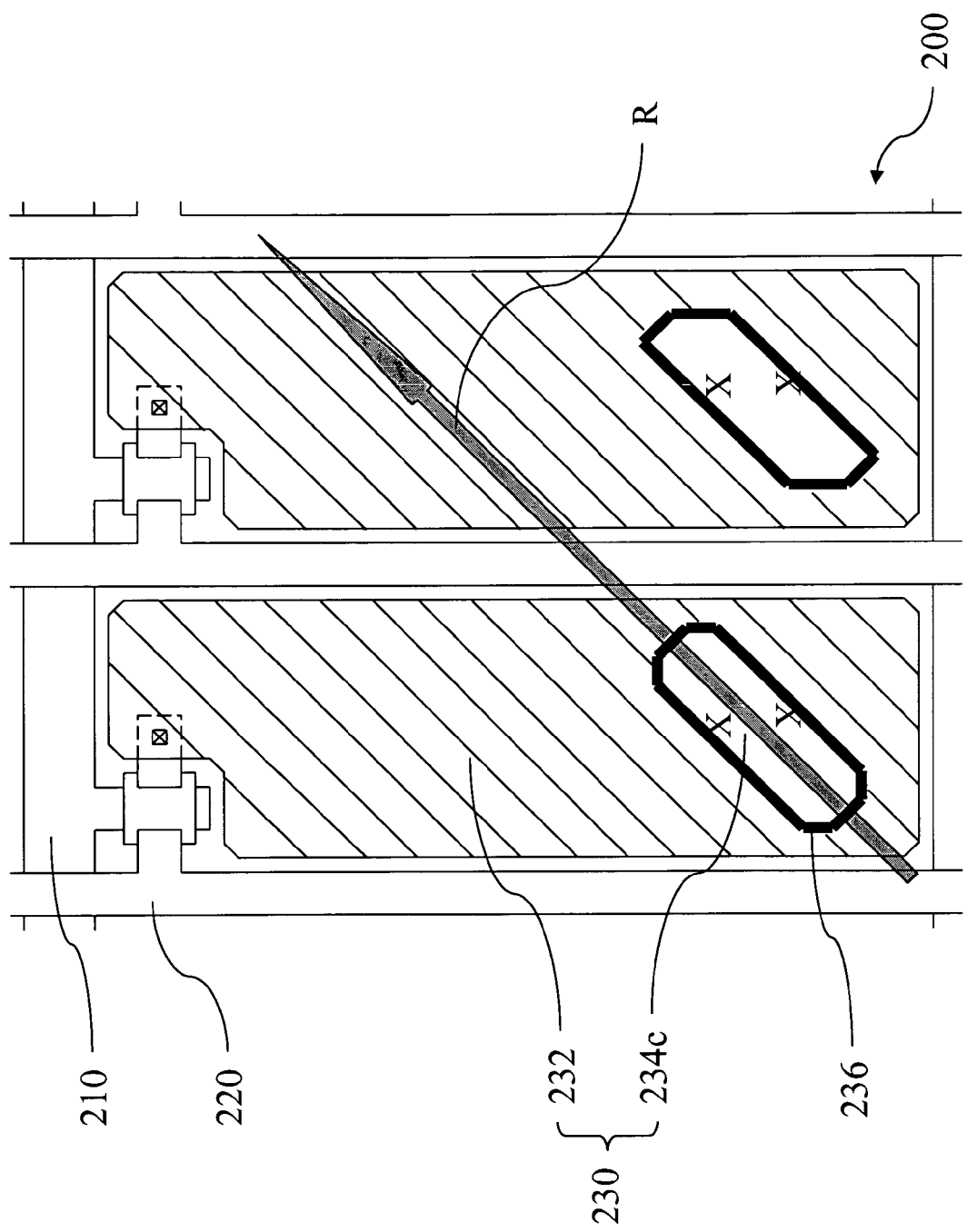
Figure 6B:
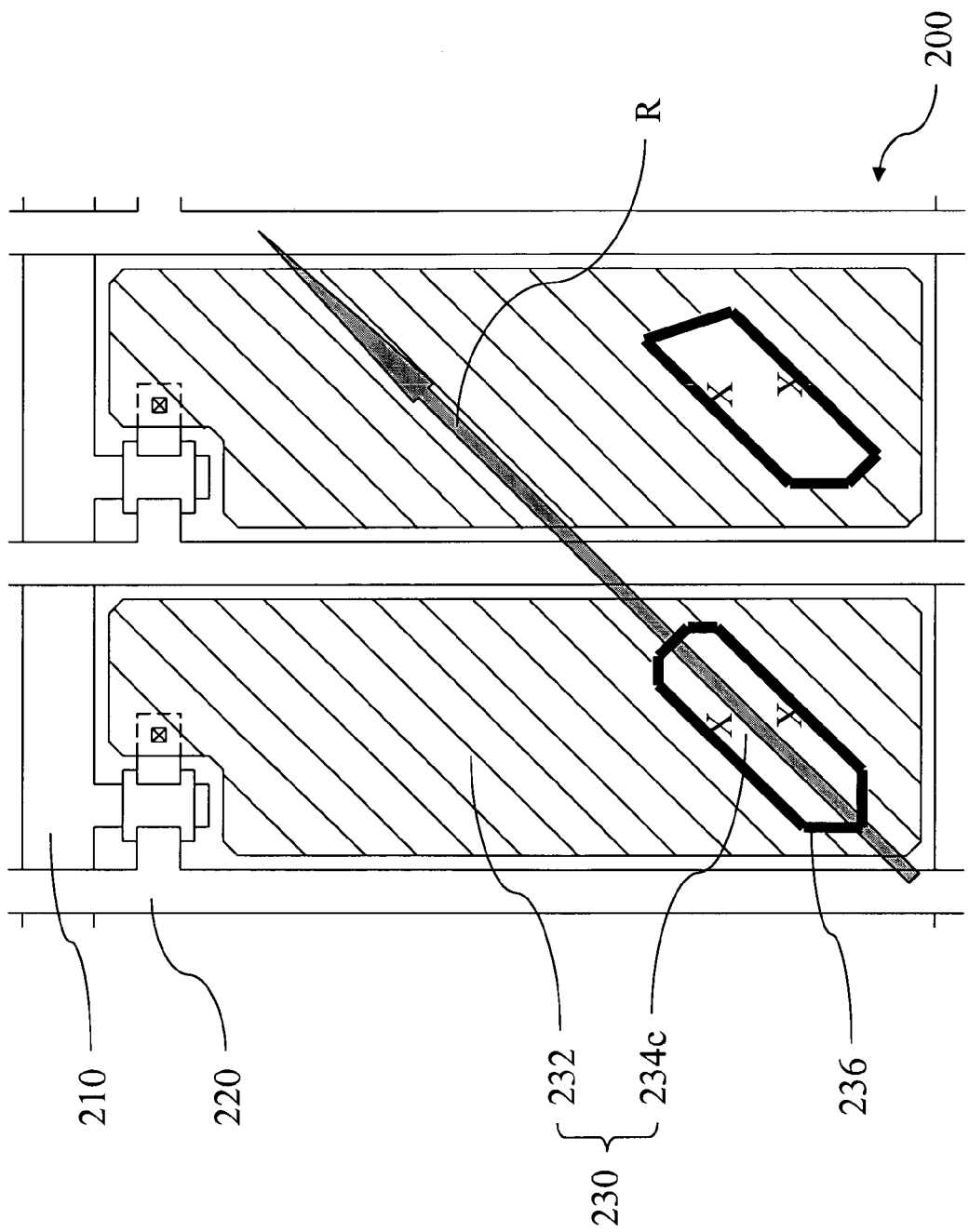

In FIGS. 5A, 6A and 6B, the pair of opposite sides X parallel the rubbing direction R of the alignment film 240 (shown in FIG. 2). In FIG. 5B and FIG. 5C, an included angle α between the pair of opposite sides X and the rubbing direction R of the alignment film 240 (shown in FIG. 2) is smaller than or equal to 30 degree.

Fourth Embodiment

Figure 7A:
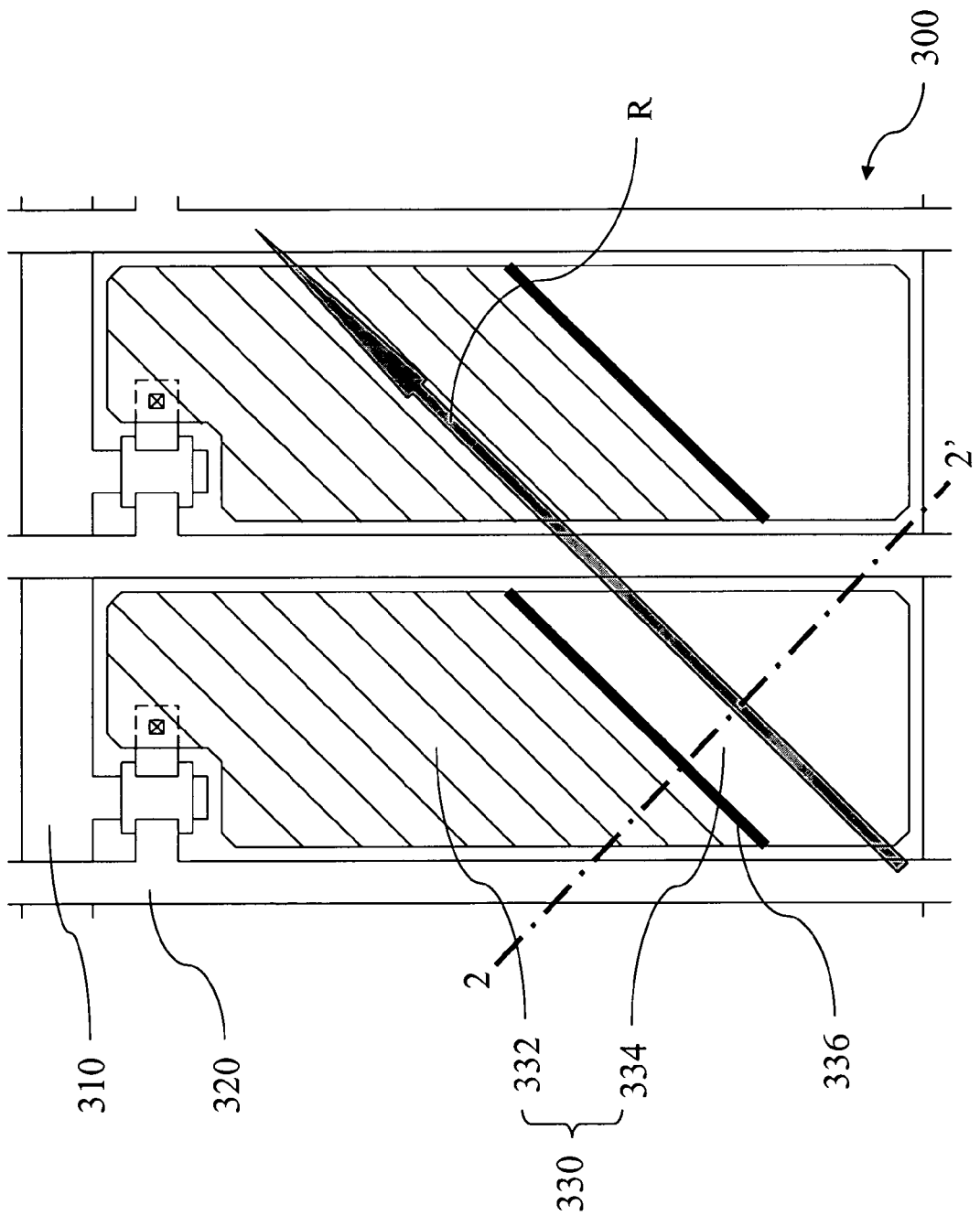
Figure 7B:
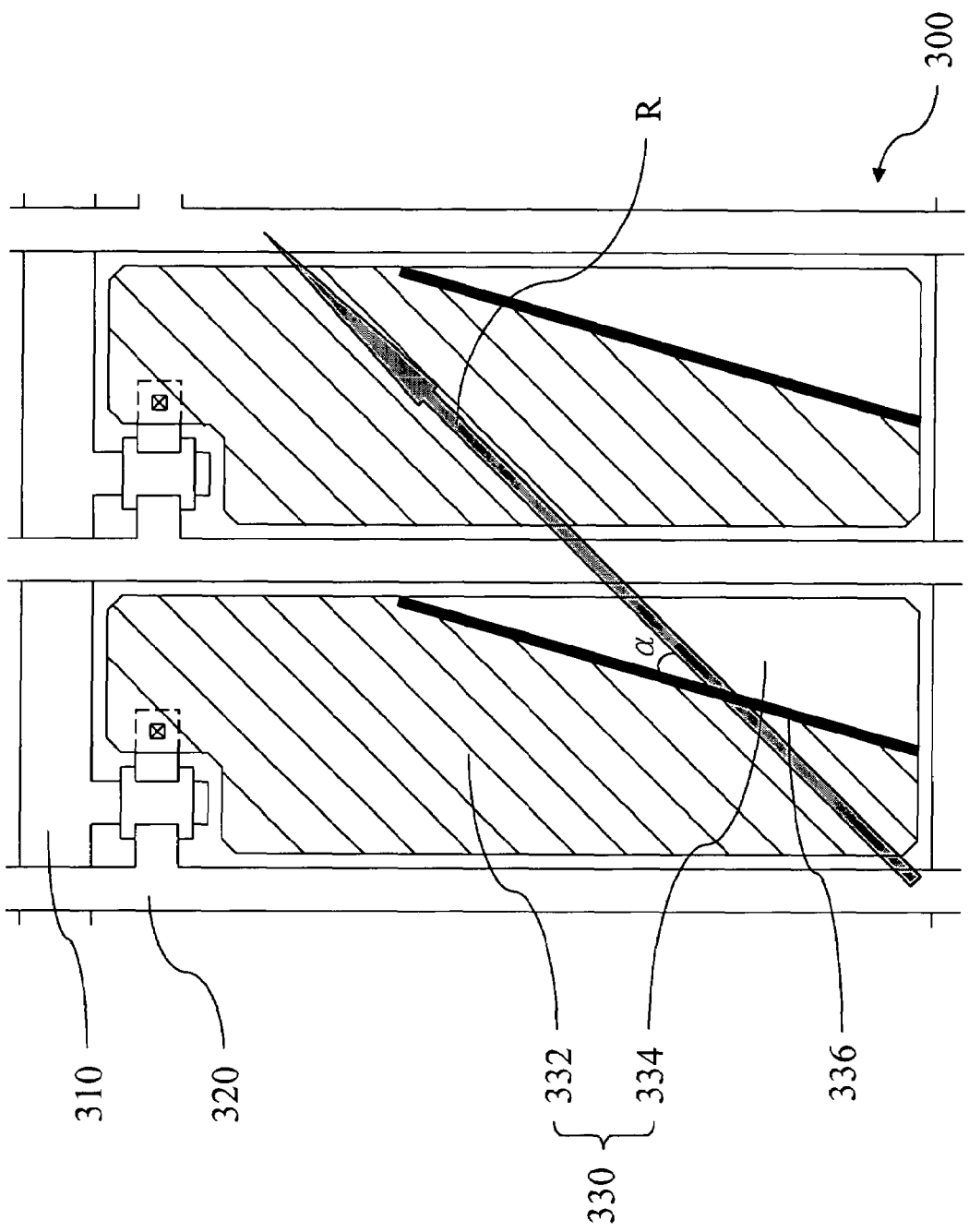

FIG. 7A~FIG. 7C are schematic top views of a transflective thin film transistor array according to the fourth embodiment of the present invention. FIG. 2 is a cross-sectional view taken along line 2-2' of FIG. 7A.

Referring to FIG. 2 and FIG. 7A, the thin film transistor array 300 of the present embodiment includes a substrate 200a, a plurality of scan lines 310, a plurality of data lines 320, a plurality of pixels 330 and an alignment film 240 (shown in FIG. 2). The scan lines 310, the data lines 320 and the pixels 330 are disposed on the substrate 200a. More specifically, a plurality of pixel-areas is defined by the scan lines 310 and the data lines 320, and the pixels 330 are disposed in corresponding pixel-area. Moreover, the alignment film 240 (shown in FIG. 2) is disposed over the substrate 200a to cover the scan lines 310, the data lines 320 and the pixels 330 such that arrangement (pre-tilt or orientation etc.) of the liquid crystal layer 500 is controlled thereby. In the present embodiment, an included angle between one of the scan lines 310 and the rubbing direction R of the alignment film 240 (shown in FIG. 2) is about 45 degree, for example.

As shown in FIG. 7A~FIG. 7C, each pixel 330 includes a reflective region 332 and a transmissive region 334. In each pixel 330, the transmissive region 334 is connected to an edge of the reflective region 332, and a linear transition region 336 is formed between the reflective region 332 and the transmissive region 334. It should be noted that an included angle α between the extending direction of the linear transition region 336 and a rubbing direction R of the alignment film 240 (shown in FIG. 2) is smaller than or equal to 30 degree.

As shown in FIG. 7A~FIG. 7C, the profile of the transmissive regions 334 is a rectangle having a side connected with the edge of the reflective region 332, for example. In FIG. 7A, the extending direction of the linear transition region 336 is parallel to the rubbing direction R of the alignment film 240 (shown in FIG. 2). In FIG. 7B and FIG. 7C, an included angle α between the extending direction of the linear transition region 336 and the rubbing direction R of the alignment film 240 (shown in FIG. 2) is smaller than or equal to 30 degree.

In the embodiments illustrated above, the number of the transmissive region is not limited, the spirit of the present invention may be applied to pixels having more than one transmissive region.

Fifth Embodiment

In the present invention, the thin film transistor array may be fabricated by following steps. First, a substrate with scan lines, data lines and pixels thereon is provided. Each pixel comprises a reflective region and a transmissive region, the transmissive region is connected to and enclosed by the reflective region, and a transition region is formed between the reflective region and the transmissive region. Then, a dielectric layer is formed over the substrate to cover the scan lines, the data lines and the pixels. Ultimately, the dielectric layer is rubbed to form an alignment film with a rubbing direction, wherein an included angle between at least one side of the transmissive regions and the rubbing direction of the alignment film is smaller than or equal to 30 degree. Because the included angle α between the linear transition region and the rubbing direction of the alignment film is smaller than or equal to 30 degree, light leakage phenomenon is reduced. Therefore, contrast ratio of image displayed by a transflective LCD panel using the transflective thin film transistor array in accordance with the present invention is improved. As described above, high definition transflective LCD panels having enhanced contrast ratio are feasible.

The foregoing description of the preferred embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An array substrate, comprising:
   a substrate;
   a plurality of pixels arranged in an array, disposed on the substrate, the pixel comprising a reflective region, a transmissive region, and a transition region formed between the reflective region and the transmissive region, wherein the transition region between the transmissive region and the reflective region comprises a step from the transmissive region to the reflective region; and
   an alignment film, disposed on the pixels, wherein an included angle between at least one side of the transition region and a rubbing direction of the alignment film is smaller than or equal to 30 degree.

2. The array substrate of claim 1, wherein the transition region is of polygon profile.

3. The array substrate of claim 1, wherein the transmissive region is enclosed by the reflective region.

4. The array substrate of claim 3, wherein the profile of the transition region is rectangle or parallelogram having a pair of first opposite sides and a pair of second opposite sides, wherein the length of the pair of first opposite sides is longer than that of the pair of second opposite sides.

5. The array substrate of claim 4, wherein an included angle between one of the pair of first opposite sides and the rubbing direction of the alignment film is smaller than or equal to 30 degree.

6. The array substrate of claim 4, wherein one of the pair of the first opposite sides is parallel to the rubbing direction of the alignment film.

7. The array substrate of claim 1, wherein the transmissive region is connected to an edge of the reflective region, and a linear transition region is formed between the reflective region and the transmissive region.

8. The array substrate of claim 7, wherein an included angle between the linear transition region and the rubbing direction of the alignment film is smaller than or equal to 30 degree.

9. The array substrate of claim 8, wherein the linear transition region is parallel to the rubbing direction of the alignment film.

10. The array substrate of claim 1, wherein the step includes a change in height, relative to the substrate, of the transmissive region to the reflective region.

11. The array substrate of claim 10, wherein the height changes from a lower height in the transmissive region to a higher height in the reflective region.

12. A transflective liquid crystal display panel, comprising:
    an array substrate, comprising:
       a substrate;
       a plurality of pixels arranged in an array, disposed on the substrate, the pixel comprising a reflective region, a transmissive region, and a transition region formed between the reflective region and the transmissive region, wherein the transmissive region is associated with a first liquid crystal cell gap and the reflective region is associated with a second liquid crystal cell gap that is smaller than the first liquid crystal cell gap; and
       an alignment film, disposed on the pixels, wherein an included angle between at least one side of the transition region and a rubbing direction of the alignment film is smaller than or equal to 30 degree;
    an opposite substrate, above the array substrate; and
    a liquid crystal layer, located between the opposite substrate and the array substrate.

13. An electronic device comprising:
    the transflective liquid crystal display panel as claimed in claim 12;
    an input unit operatively coupled to the transflective LCD panel and providing an input signal to the panel to generate image.

14. The transflective liquid crystal display panel of claim 12, wherein the transition region includes a change in a first distance between top of the transmissive region and the opposite substrate, to a second distance between the top of the reflective region and the opposite substrate, wherein the first distance is larger than the second distance.

15. The transflective liquid crystal display panel of claim 12, wherein the transition region includes a change in height from a lower height relative to the substrate in the transmissive region to a higher height relative to the substrate in the reflective region.

16. A fabricating method of an array substrate, comprising the steps of:
    providing a substrate with a plurality of pixels thereon, wherein the pixel comprising a reflective region, a transmissive region, and a transition region formed between the reflective region and the transmissive region, wherein the transition region includes a change in height from a lower height relative to the substrate in the transmissive region to a higher height relative to the substrate in the reflective region;
    forming a dielectric layer over the substrate to cover the pixels; and
    rubbing the dielectric layer to form an alignment film with a rubbing direction, wherein an included angle between at least one side of the transition region and the rubbing direction of the alignment film is smaller than or equal to 30 degree.

17. The method of claim 16, wherein the rubbing step comprise rubbing the dielectric layer to form an alignment film with a rubbing direction, wherein an included angle between at least one side of the transition region and the rubbing direction of the alignment film is equal to 0 degree.

* * * * *